(12) United States Patent
Masui et al.

(10) Patent No.: US 6,305,241 B1
(45) Date of Patent: Oct. 23, 2001

(54) HANDLEBAR ADAPTER FOR MOUNTING A BICYCLE DISPLAY

(75) Inventors: Takuji Masui; Shigekatsu Okada, both of Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/340,519

(22) Filed: Jun. 28, 1999

(51) Int. Cl.$^7$ ............................... B62J 11/00; B62J 39/00
(52) U.S. Cl. ........................................ 74/551.8; 224/420
(58) Field of Search ........................ 74/551.8, 551.1; 248/230.5, 230.3, 222.14, 316.6; 340/432; 362/473, 474; 224/420, 448, 929

(56) References Cited

U.S. PATENT DOCUMENTS

| | | | |
|---|---|---|---|
| 490,750 | * | 1/1893 | Kuhn ................................ 224/448 X |
| 4,071,892 | | 1/1978 | Genzling ............................. 364/424 |
| 4,270,724 | * | 6/1981 | McMullen ...................... 248/230.5 X |
| 4,357,651 | * | 11/1982 | Mayer ................................ 362/275 |
| 4,435,983 | * | 3/1984 | Shimano .............................. 73/493 |
| 4,489,307 | | 12/1984 | Nagano .............................. 340/134 |
| 4,541,555 | * | 9/1985 | Miree ............................. 74/551.8 X |
| 4,770,435 | * | 9/1988 | Cristie ............................ 74/551.8 X |
| 4,819,217 | * | 4/1989 | Houlihan .......................... 224/448 X |
| 4,860,177 | * | 8/1989 | Simms ................................ 362/473 |
| 4,881,187 | | 11/1989 | Read ................................. 364/565 |
| 4,930,436 | * | 6/1990 | Newman ....................... 248/230.5 X |
| 5,114,060 | * | 5/1992 | Boyer .............................. 224/448 X |
| 5,163,339 | * | 11/1992 | Giard, Jr. et al. ............. 74/551.8 X |
| 5,370,412 | | 12/1994 | Chon ................................. 280/288.4 |
| 5,413,007 | * | 5/1995 | Vernon .............................. 73/866.3 |
| 5,509,328 | | 4/1996 | Lai ..................................... 74/551.3 |
| 5,516,021 | * | 5/1996 | Douglass ...................... 248/230.5 X |
| 5,597,148 | * | 1/1997 | Gospodarich ................. 248/230.5 X |
| 5,634,620 | * | 6/1997 | Verot ............................ 248/230.5 X |
| 5,667,185 | * | 9/1997 | Maglica ........................... 362/474 X |
| 5,678,458 | * | 10/1997 | Kao ................................ 74/551.1 X |
| 5,825,665 | * | 10/1998 | Swift et al. ......................... 702/154 |

FOREIGN PATENT DOCUMENTS 2654698   5/1991  (FR) .

OTHER PUBLICATIONS

Performance CM500 Cycle Computer installation instructions, p. 8 and 9, published prior to the filing date of this application.
German cycle computer catalog, published prior to the filing date of this application.
Sigma Sport cycle computer catalog, published prior to the filing date of this application.

* cited by examiner

*Primary Examiner*—Rodney H. Bonck
*Assistant Examiner*—Ankur Parekh
(74) *Attorney, Agent, or Firm*—James A. Deland

(57) ABSTRACT

A device for mounting a bicycle display to a steering member of a bicycle includes a mounting arch; a display coupler disposed on the mounting arch; a first mounting section disposed at a first end of the mounting arch and having a first mounting surface; wherein the first mounting section includes a first mounting opening extending completely through the first mounting section and intersecting the first mounting surface for receiving a first fastener therethrough; and a second mounting section disposed at a second end of the mounting arch and having a second mounting surface that does not face the first mounting surface.

25 Claims, 11 Drawing Sheets

HANDLEBAR ADAPTER FOR MOUNTING A BICYCLE DISPLAY

BACKGROUND OF THE INVENTION

The present invention is directed to bicycle components and, more particularly, to a handlebar adapter for mounting a bicycle display.

Displays for displaying various riding parameters have become quite common on bicycles. Such displays may comprise an electronic computer which measures and displays information such as the time of day, the speed of the bicycle, the distance traveled, the pedal rotational velocity, and so on, or they may comprise a mechanical display for displaying the shift position of the bicycle transmission or some other parameter. The displays normally are mounted on the handlebar using a band that wraps around the handlebar. The rider may look at the display while riding to ascertain the desired information.

One disadvantage of conventional bicycle displays is that, since they are mounted to the handlebar using a band that wraps around the handlebar, they must be offset from the handlebar attachment stem that is located at the middle of the handlebar. Thus, the rider must not only look down from the usual riding direction, but he or she also must look slightly to the side to view the offset display, thus adding to the diversion. Also, since the display is mounted to the handlebar, the space occupied by the display decreases the handlebar area available for gripping by the rider. This is very undesirable since the ability to vary the position of the hands along the handlebar as much as possible is important to prevent fatigue and numbness of the hand during riding. Furthermore, the curved shape of many handlebars sometimes makes it difficult to mount the display so that the display is oriented correctly.

SUMMARY OF THE INVENTION

The present invention is directed to a handlebar adapter for mounting a bicycle display to the bicycle so that the display can be centered relative to the handlebar for easier viewing without taking space on the handlebar itself. The present invention also is directed to a handlebar adapter that allows the display to be oriented in any desired direction to accommodate the different shapes of various bicycle handlebars.

In one embodiment of the present invention, a device for mounting a bicycle display to a steering member of a bicycle includes a mounting arch; a display coupler disposed on the mounting arch; a first mounting section disposed at a first end of the mounting arch and having a first mounting surface; wherein the first mounting section includes a first mounting opening extending completely through the first mounting section and intersecting the first mounting surface for receiving a first fastener therethrough; and a second mounting section disposed at a second end of the mounting arch and having a second mounting surface that does not face the first mounting surface. This structure allows the device to be mounted directly to the handlebar stem.

In a more specific embodiment of the present invention directed to an device for mounting a bicycle display to a steering member, the device includes a handlebar stem, a display coupling member and a coupler for coupling the handlebar stem to the display coupling member. The handlebar stem has a first end for attaching to the steering member and a second end. The second end includes a stem arch, a first stem arch mounting section disposed at a first end of the stem arch and having a first stem arch surface, and a second stem arch mounting section disposed at a second end of the stem arch and having a second stem arch surface. The display coupling member includes a display mounting arch, a display coupler disposed on the display mounting arch, a first display mounting arch mounting section disposed at a first end of the display mounting arch and having a first display mounting arch surface that faces the first stem arch surface, and a second display mounting arch mounting section disposed at a second end of the display mounting arch and having a second display mounting arch surface that faces the second stem arch surface.

In another embodiment of the present invention, a device for mounting a bicycle display to a steering member of a bicycle includes a mounting arch; a display coupler disposed on the mounting arch, wherein the display coupler includes a rotational position setting member for setting a rotational position of the display relative to the mounting arch; a first mounting section disposed at a first end of the mounting arch and having a first mounting surface; and a second mounting section disposed at a second end of the mounting arch and having a second mounting surface. The rotational position setting member allows the display to be set in the proper position to compensate for the orientation of the handlebar.

To further facilitate viewing of the display, another embodiment of the present invention includes a mounting arch having a concave inner peripheral surface, a first mounting section disposed at a first end of the mounting arch and having a first mounting surface, a second mounting section disposed at a second end of the mounting arch and having a second mounting surface, an extension member extending outwardly from the mounting arch, and a display disposed on an end of the extension member. The extension member may be used to place the display in a convenient viewing location. If desired, a hinge may be positioned between the extension member and the display to allow the display to be tilted to a desired viewing angle.

DETAILED DESCRIPTION OF THE EMBODIMENTS

Figure 1:
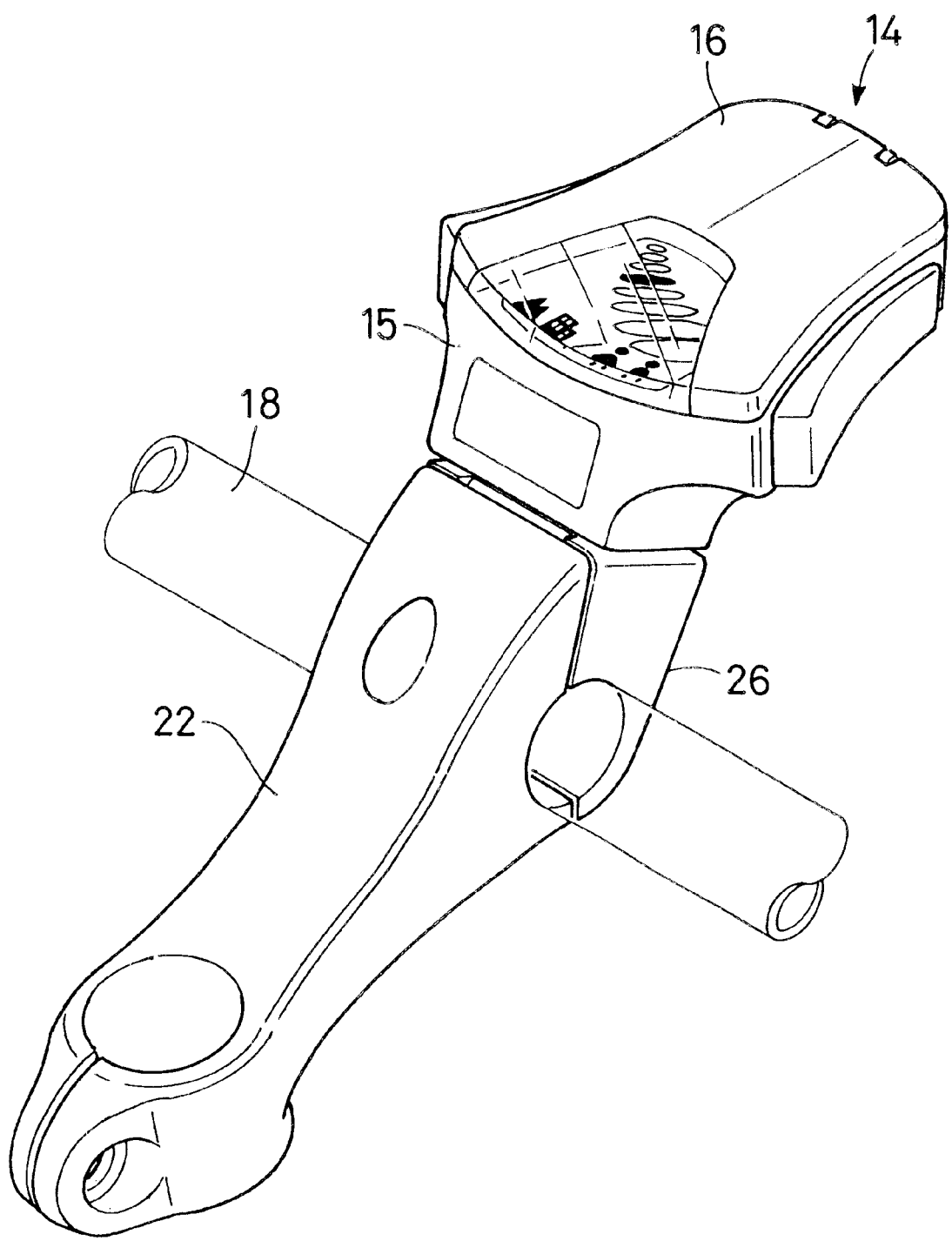
FIG. 1 is a perspective view of a particular embodiment of an apparatus according to the present invention for mounting a bicycle display to a steering member of a bicycle.
Figure 2:
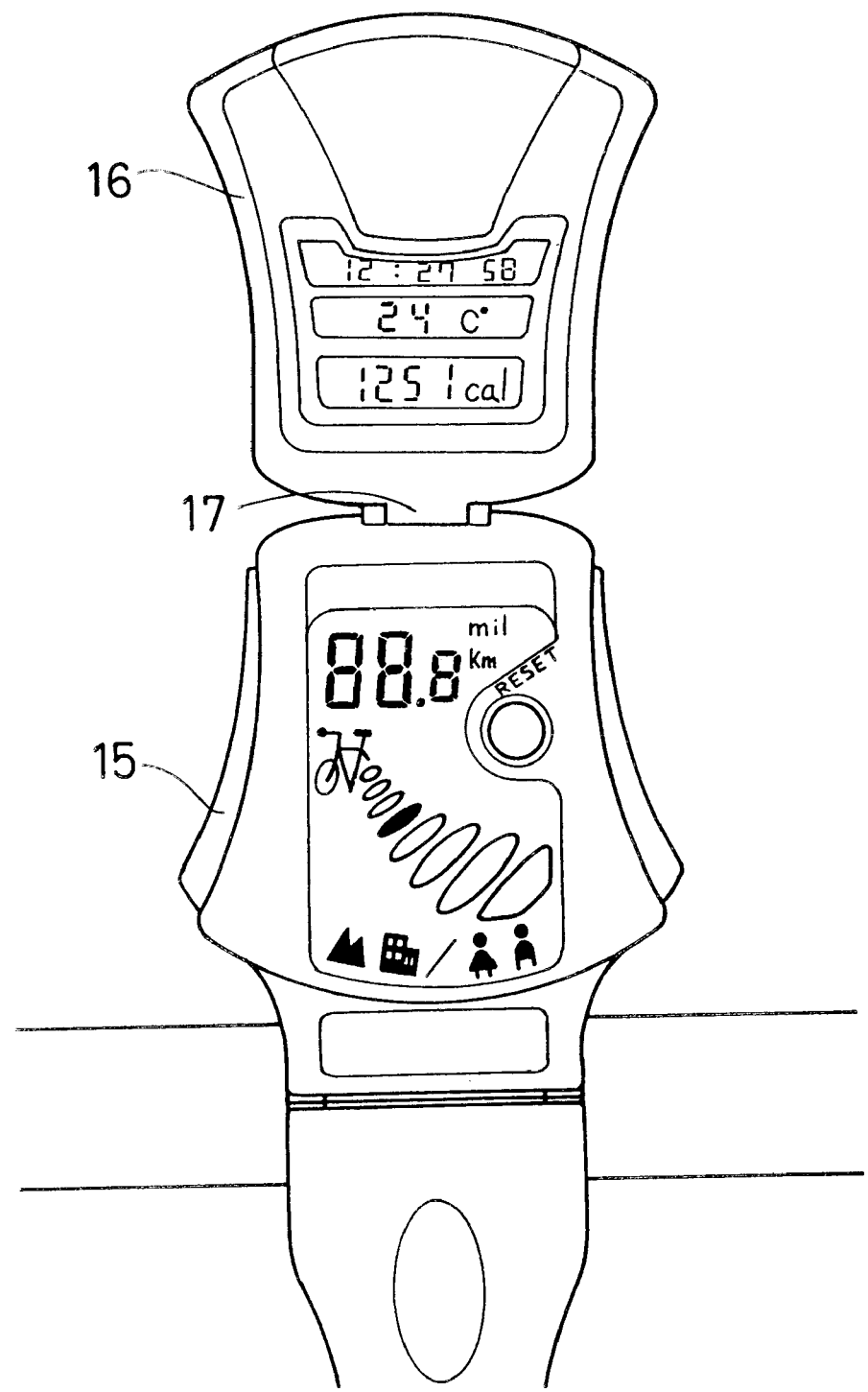
FIG. 2 is a top view of the apparatus shown in FIG. 1 illustrating how the display is centered relative to the handlebar.
Figure 3:
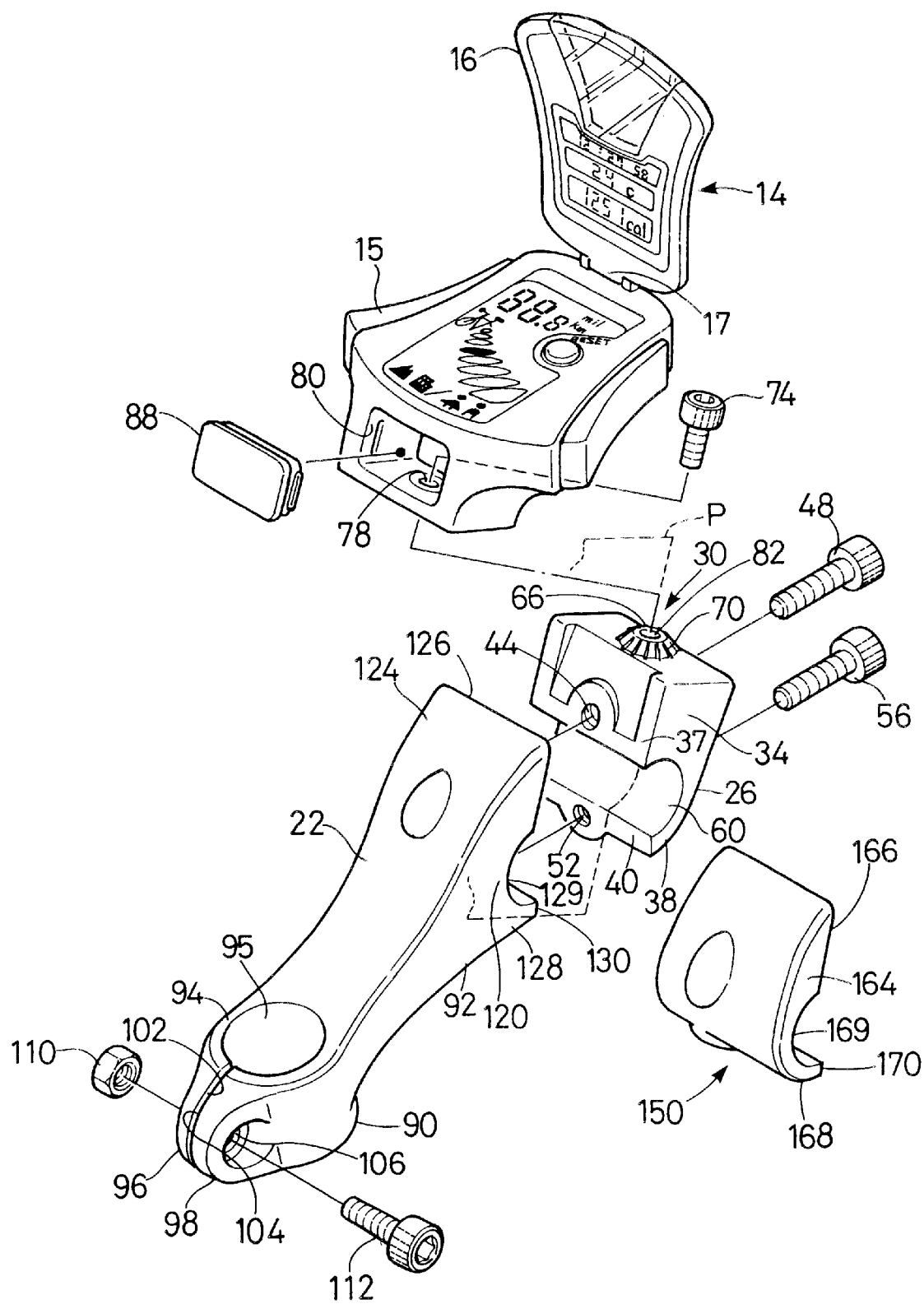
FIG. 3 is an exploded view of the apparatus shown in FIG. 1.

FIG. 1 is a perspective view of a particular embodiment of an apparatus according to the present invention for mounting a bicycle display 14 to a steering member of a bicycle such as a handlebar 18 or handlebar stem 22. FIG. 2 is a top view showing how the display 14 is centered relative to handlebar 18, and FIG. 3 is an exploded view of the apparatus. In this embodiment, display 14 is a computer display of the type having a base member 15 and a cover 16 pivotably mounted to base member 15 through a hinge 17 so that cover 16 may be selectively opened and closed as desired. Base member 15 and cover 16 both include LCD panels for displaying information as shown in FIGS. 2 and 3. Of course, display 14 also may be a mechanical display for displaying information such as the shift position of the bicycle transmission or some other information.

As shown in FIGS. 1–3, the apparatus includes a mounting arch 26, a display coupler 30 disposed on mounting arch 26; a first mounting section 34 disposed at a first end of mounting arch 26 and having a first mounting surface 37, and a second mounting section 38 disposed at a second end of mounting arch 26 and having a second mounting surface 40 that does not face first mounting surface 37. First mounting section 34 includes a first mounting opening 44 extending completely through first mounting section 34 and intersecting first mounting surface 37 for receiving a first fastener in the form of a first bolt 48 therethrough. Similarly, second mounting section 38 includes a second mounting opening 52 extending completely through second mounting section 38 and intersecting second mounting surface 40 for receiving a second fastener in the form of a second bolt 56 therethrough.

In this embodiment, mounting arch 26 is formed from a relatively thick aluminum alloy and curves by no more than 180°. However, if mounting arch 26 is made from a relatively resilient material then mounting arch 26 may curve by more than 180°. Also, in this embodiment, first mounting surface 37 is substantially parallel to second mounting surface 40. If desired, first mounting surface 37 and second mounting surface 40 can be formed to lie in substantially a same plane Q as occurs the embodiment shown in FIG. 5. Furthermore, mounting arch 26 has a semicircular inner peripheral surface 60, wherein first mounting surface 37 is disposed at a first end of inner peripheral surface 60 and substantially perpendicular thereto, and second mounting surface 40 is disposed at a second end of inner peripheral surface 60 and substantially perpendicular thereto. Of course, inner peripheral surface 60 can have any shape that suits the particular application.

Display coupler 30 is disposed in close proximity to one of the first mounting surface 37 and the second mounting surface 40, and in this embodiment it is disposed in close proximity to first mounting surface 37. Of course, in other embodiments display coupler 30 can be located in some other position. Display coupler 30 includes a display mounting member 66, wherein a plane P perpendicular to inner peripheral surface 60 intersects display mounting member 66 as well as being perpendicular to first mounting surface 37 and second mounting surface 40. In this embodiment, display mounting member 66 functions as a rotational position setting member for setting a rotational position of display 14 relative to mounting arch 26. For this purpose, display mounting member 66 has a semicircular or preferably a hemispherical shape with coupling splines 70 to fix display 14 in the desired rotational position. Display 14 includes a complementary hemispherical recess (not shown) with complementary splines (not shown) to engage display mounting member 66 in the desired rotational position. A fastener 74 extends through an opening 78 disposed in an access hole 80 in base member 15 and into a threaded opening 82 in display mounting member 66 to fasten display 14 to mounting arch 26. A cover 88 may be placed over access hole 80 for aesthetic purposes.

In this embodiment, mounting arch 26 is used to couple display 14 directly to handlebar stem 22. Handlebar stem 22 includes a first end 90 for attachment to a steering member such as a steering fork (not shown) and a second end 92. First end 90 includes a collar 94 with a collar opening 95 and coupling ears 96 and 98 for attaching handlebar stem 22 to the steering member. Coupling ears 96 and 98 include respective surfaces 102 and 104 that face each other and respective openings (only opening 106 is shown in FIGS. 1 and 3) so that coupling ears 96 and 98 may be pressed toward each other using a nut 110 and bolt 112 to thereby reduce the diameter of collar opening 95 in a conventional manner and thereby affix handlebar stem 22 to the steering member.

Second end 92 of handlebar stem 22 includes a stem arch 120, a first stem arch mounting section 124 disposed at a first end of stem arch 120, and a second stem arch mounting section 128 disposed at a second end of stem arch 120. A semicircular or other-shaped concave inner peripheral surface 129 is formed between first stem arch mounting section 124 and second stem arch mounting section 128. First stem arch mounting section 124 has a first stem arch surface 126 that faces first mounting surface 37 of mounting arch 26, and second stem arch mounting section 128 has a second stem arch surface 130 that faces second mounting surface 40 of mounting arch 26. A first threaded blind hole (not shown) intersecting first stem arch surface 126 is disposed in first stem arch mounting section 124 so as to align with first mounting opening 44 in mounting arch 26, and a second threaded blind hole (not shown) intersecting second stem arch surface 130 is disposed in second stem arch mounting section 128 so as to align with second mounting opening 52 in mounting arch 26. As a result, mounting arch 26 (and display 14) may be fastened to stem arch 120 by passing bolts 48 and 56 through first mounting opening 44 and second mounting opening 52, respectively, and screwing them into their respective threaded blind holes in first stem arch mounting section 124 and second stem arch mounting section 128.

Figure 4:
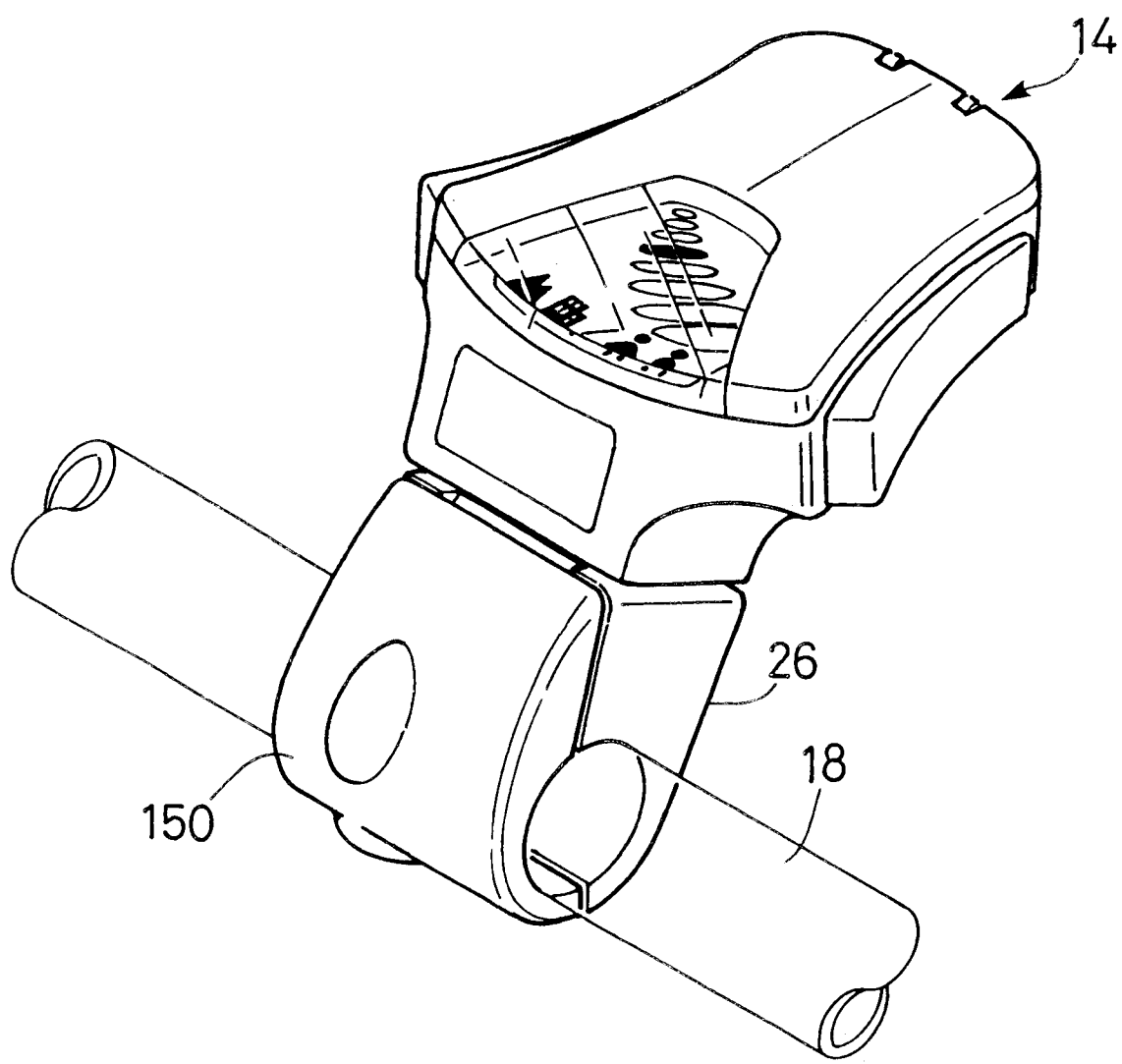
FIG. 4 is a perspective view of an alternative embodiment of an apparatus according to the present invention for mounting a bicycle display to a steering member of a bicycle.

Instead of coupling mounting arch 26 to handlebar stem 22, mounting arch 26 may be coupled to a complementary arch 150 (also shown in FIG. 3) for coupling display 14 directly to handlebar 18 as shown in FIG. 4. As with stem arch 120, complementary arch 150 includes a first complementary arch mounting section 164 disposed at a first end of complementary arch 150 and a second complementary arch mounting section 168 disposed at a second end of complementary arch 150. First complementary arch mounting section 164 has a first complementary arch surface 166 that faces first mounting surface 37 of mounting arch 26, and second complementary arch mounting section 168 has a second complementary arch surface 170 that faces second mounting surface 40 of mounting arch 26. A semicircular or other-shaped concave inner peripheral surface 169 is formed between first complementary arch mounting section 164 and second complementary arch mounting section 168. A first threaded blind hole (not shown) intersecting first complementary arch surface 166 is disposed in first complementary arch mounting section 164 so as to align with first mounting opening 44 in mounting arch 26, and a second threaded blind hole (not shown) intersecting second complementary arch surface 170 is disposed in second complementary arch mounting section 168 so as to align with second mounting opening 52 in mounting arch 26. As a result, mounting arch 26 (and display 14) may be fastened to complementary arch 150 (and to handlebar 18) by passing bolts 48 and 56 through first mounting opening 44 and second mounting opening 52, respectively, and screwing them into their respective threaded blind holes in first complementary arch mounting section 164 and second complementary arch mounting section 168.

Figure 5:
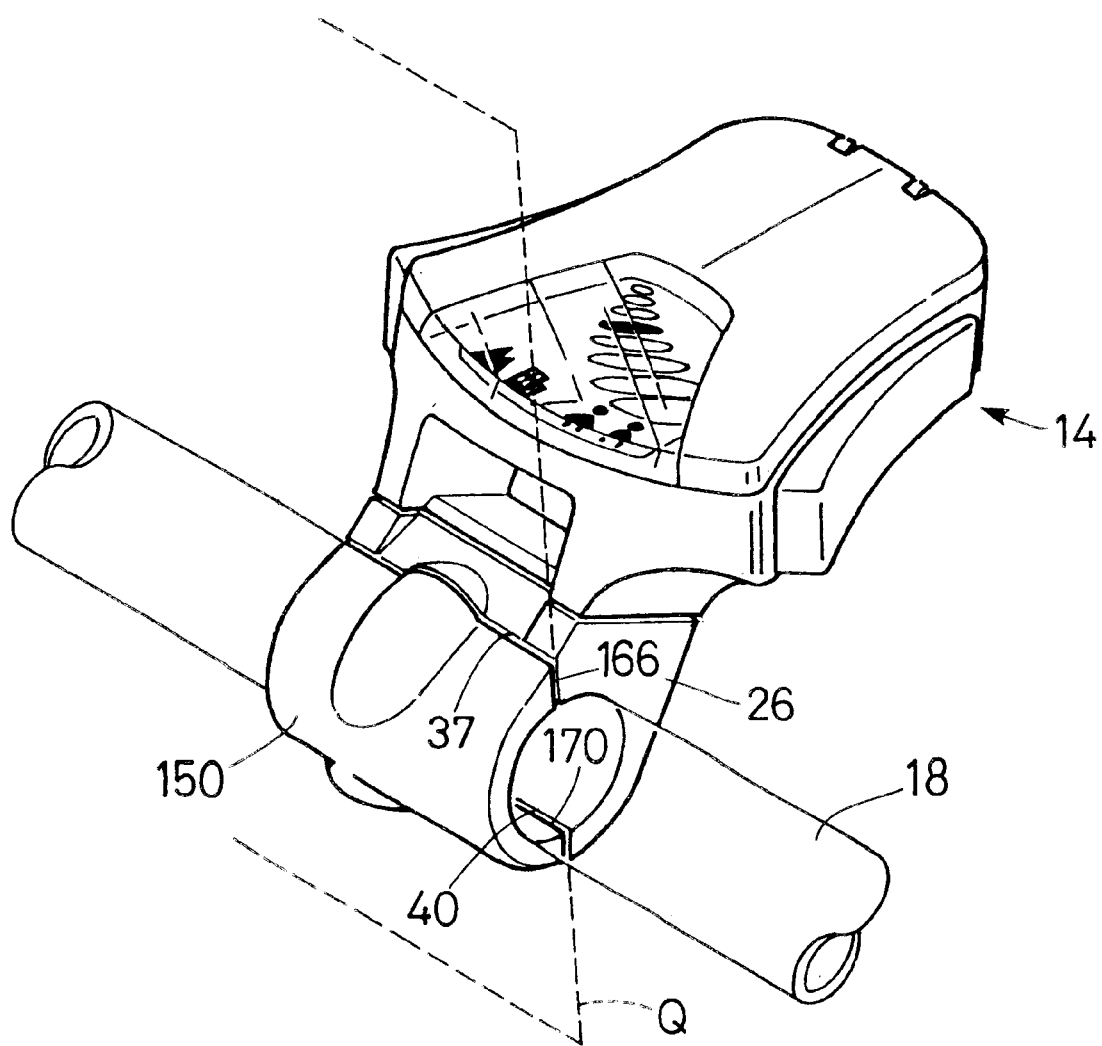
FIG. 5 is a perspective view of another alternative embodiment of an apparatus according to the present invention for mounting a bicycle display to a steering member of a bicycle.

Mounting arch 26 and complementary arch 150 may be made in any desired configuration to suit the application. For example, FIG. 5 shows a configuration where mounting arch 26 and complementary arch 150 are substantially cylindrical for mounting display 14 very close to handlebar 18. In this embodiment, as noted above, first mounting surface 37 and second mounting surface 40 are formed to lie in substantially a same plane Q to facilitate manufacture, as is first complementary arch mounting surface 166 and second complementary arch mounting surface 170.

Figure 6:
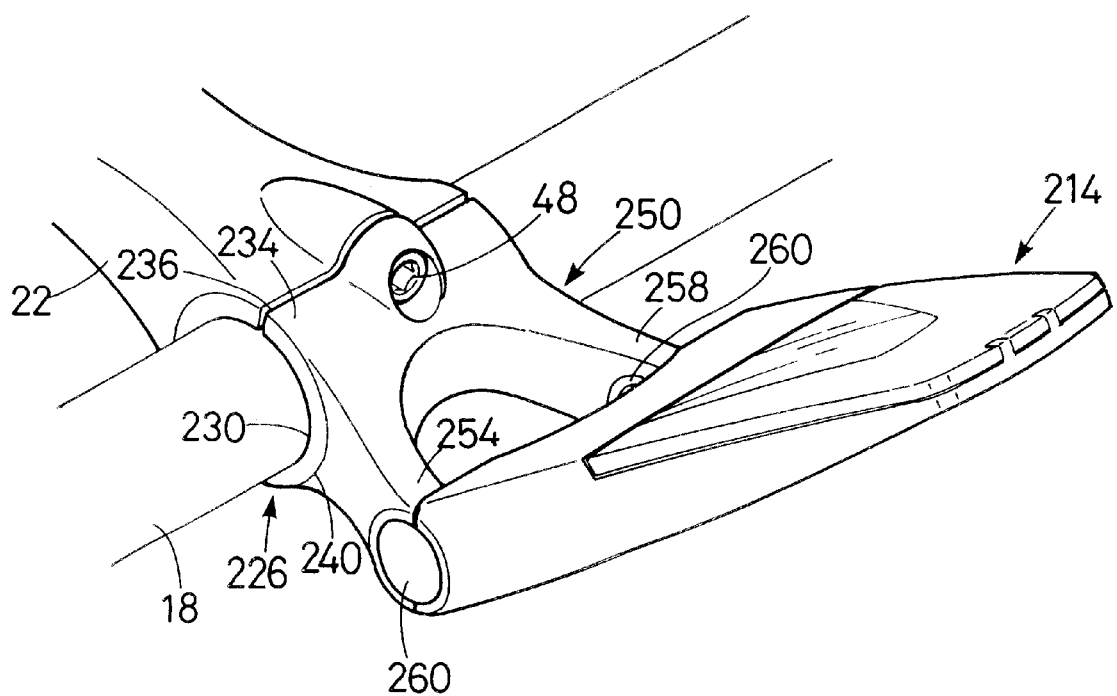
FIG. 6 is a perspective view of another alternative embodiment of an apparatus according to the present invention for mounting a bicycle display to a steering member of a bicycle, wherein the display is hinged to allow the viewing angle to be varied.

FIG. 6 is a perspective view of another alternative embodiment of an apparatus according to the present invention for mounting a bicycle display 214 to a steering member of a bicycle. In this embodiment, a mounting arch 226 has a concave inner peripheral surface 230, a first mounting section 234 disposed at a first end of mounting arch 226 and having a first mounting surface 236, and a second mounting section 240 disposed at a second end of mounting arch 226 and having a second mounting surface (not shown) in the same manner as mounting arch 26 in the first embodiment. However, in this embodiment a display coupler in the form of an extension member 250 extending radially straight outwardly from mounting arch 226 includes a first extension arm 254 and a second extension arm 258, each of which includes a hinge 260 for pivotably coupling display 214 so that the position of display 214 can be placed further from handlebar 18 and tilted to any desired viewing angle.

Figure 7:
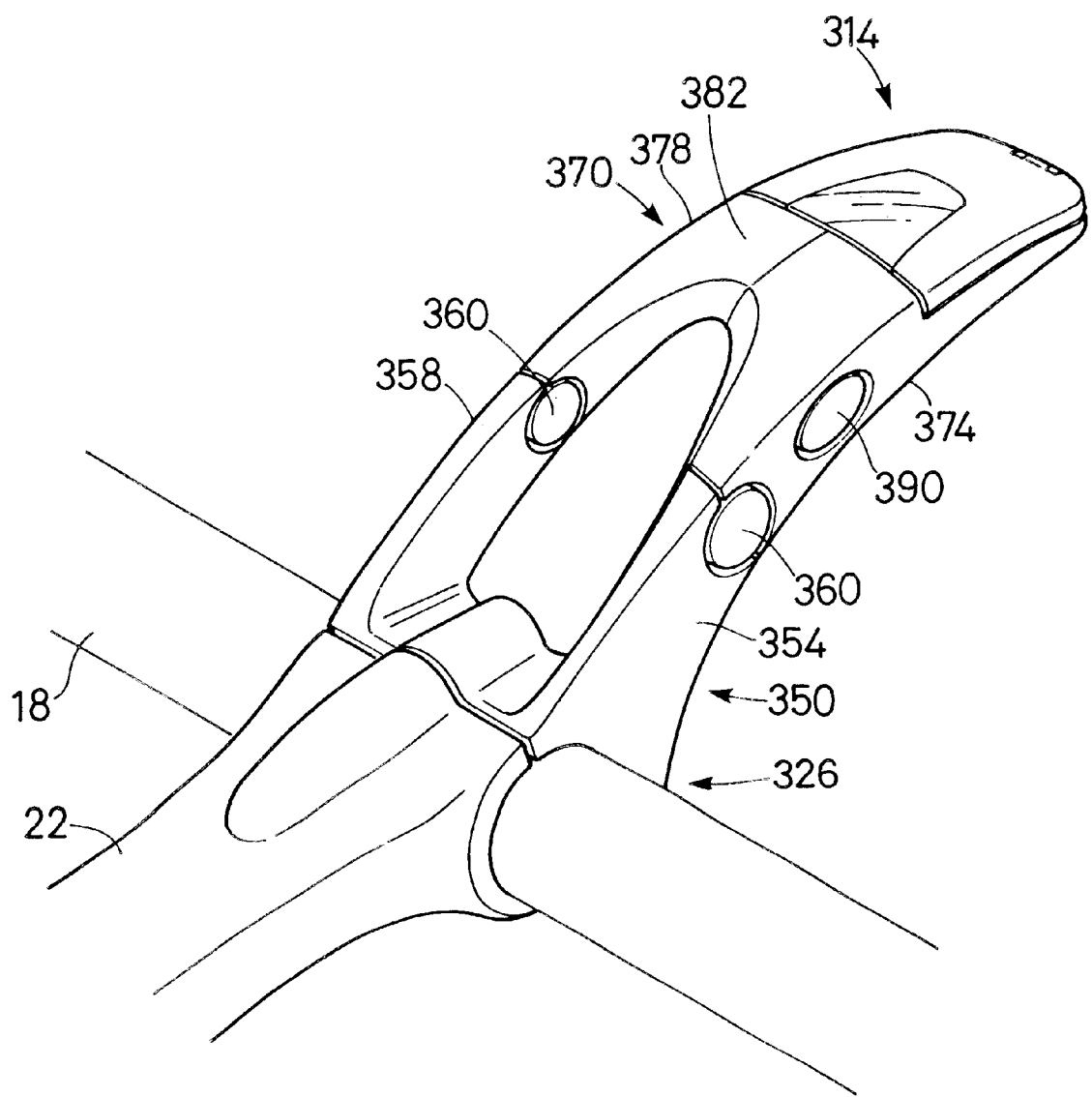
FIG. 7 is a perspective view of another alternative embodiment of an apparatus according to the present invention for mounting a bicycle display to a steering member of a bicycle, wherein the display is mounted on an elongated and curved extension member.

FIG. 7 is a perspective view of another alternative embodiment of an apparatus according to the present invention for mounting a bicycle display 314 to a steering member of a bicycle. This embodiment is similar to the embodiment shown in FIG. 6 in that it includes a mounting arch 326 and an extension member 350 in the form of a first extension arm 354 and a second extension arm 358, each of which includes a hinge 360 for pivotably coupling display 314 so that the position of display 314 can be placed further from handlebar 18 and tilted to any desired viewing angle. However, in this embodiment extension member 350 curves outwardly from mounting arch 326, and display 314 is not connected directly to hinges 360. Instead, an auxiliary extension member 370 in the form of a first auxiliary extension arm 374 and a second auxiliary extension arm 378 is connected to first extension arm 354 and second extension arm 358, respectively, through hinges 360. First auxiliary extension arm 374 and second auxiliary extension arm 378 are joined together at an upper section 382, and display 314 is formed integrally on upper section 382. A control switch in the form of a button 390 is disposed on a side surface of first auxiliary control arm 374 to facilitate the operation of display 314 by the rider.

Figure 8:
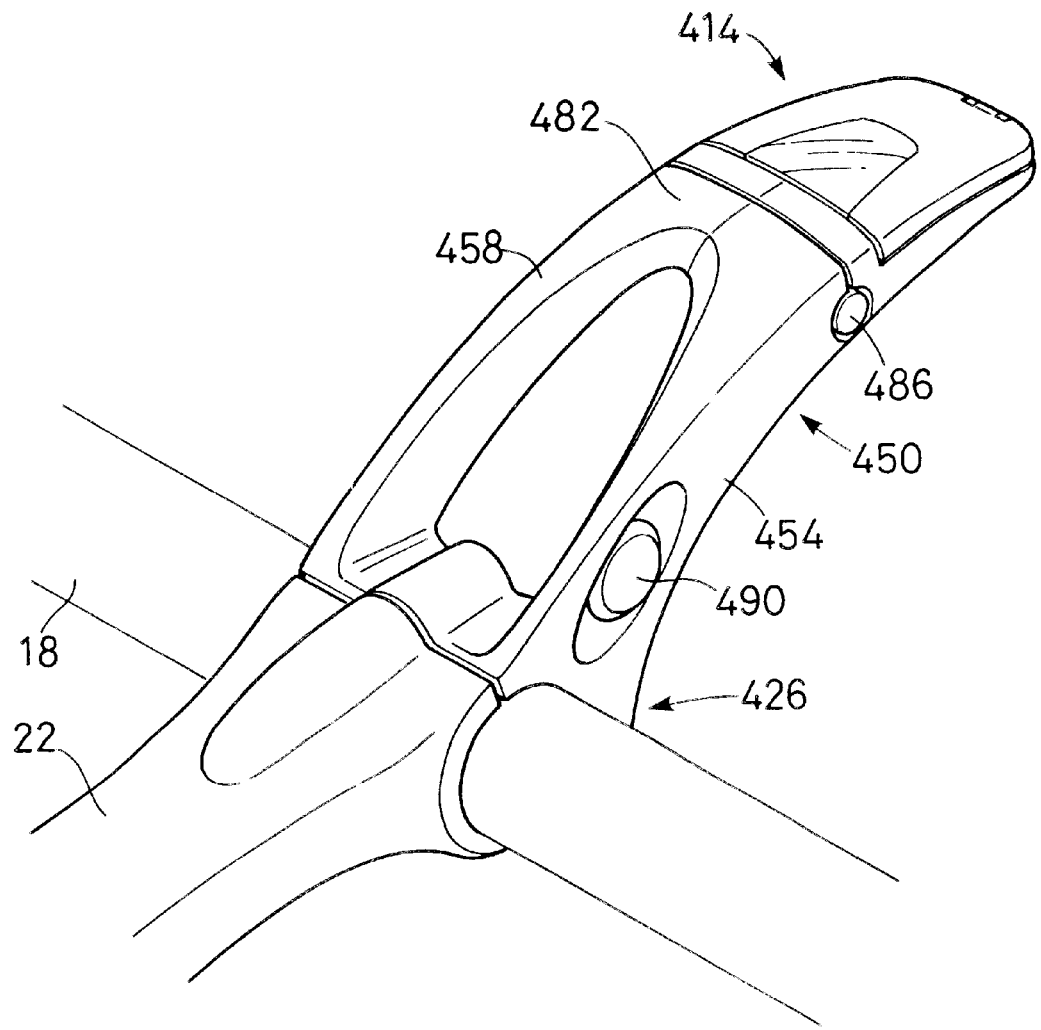
FIG. 8 is a perspective view of another alternative embodiment of an apparatus according to the present invention for mounting a bicycle display to a structural member of a bicycle, wherein the display is hinged on an elongated and curved extension member.

FIG. 8 is a perspective view of another alternative embodiment of an apparatus according to the present invention for mounting a bicycle display 414 to a steering member of a bicycle. This embodiment is similar to the embodiment shown in FIG. 7 except hinges 360 are omitted. Thus, the apparatus includes a mounting arch 426 and an extension member 450 in the form of a first extension arm 454 and a second extension arm 458. First extension arm 454 and second extension arm 458 are joined together at an upper section 482, and display 414 is pivotably mounted to upper section 482 through a hinge 486. A control switch in the form of a button 490 is disposed on a side surface of first extension arm 454 to facilitate the operation of display 414 by the rider.

Figure 9:
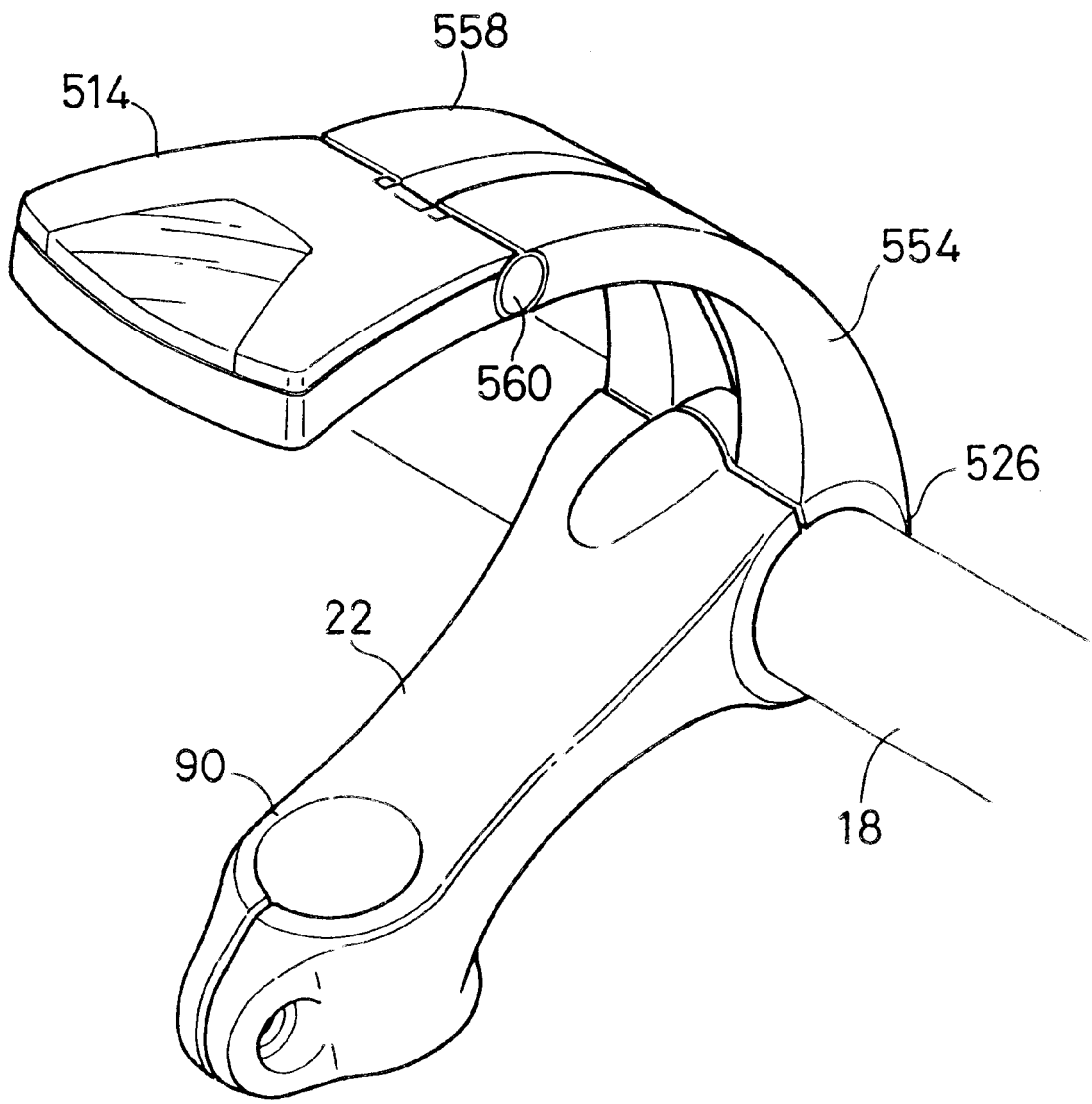
FIG. 9 is a perspective view of another alternative embodiment of an apparatus according to the present invention for mounting a bicycle display to a steering member of a bicycle, wherein the display is hinged on an elongated extension member that curves toward the rider.

FIG. 9 is a perspective view of another alternative embodiment of an apparatus according to the present invention for mounting a bicycle display 514 to a steering member of a bicycle. This embodiment is similar to the embodiment shown in FIG. 8 except a first extension arm 554 and a second extension arm 558 extend from a mounting arch 526 toward the rider, i.e., toward first end 90 of handlebar stem 22, and display 514 is directly mounted to extension arms 554 and 558 through hinges 560.

Figure 10:
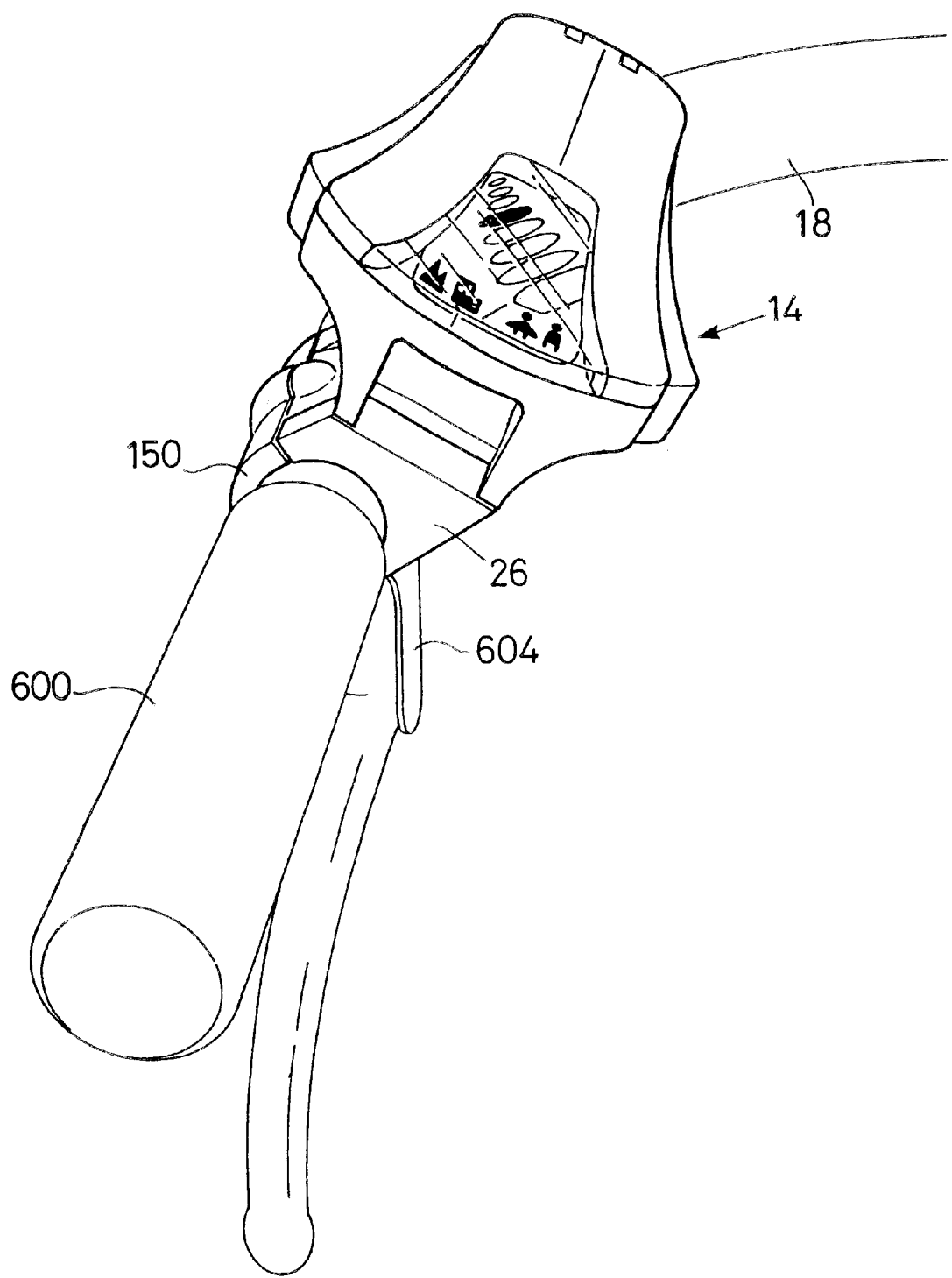
FIG. 10 is a perspective view of another alternative embodiment of an apparatus according to the present invention for mounting a bicycle display to a steering member of a bicycle, wherein the display is rotated to accommodate the orientation of the handlebar.
Figure 11:
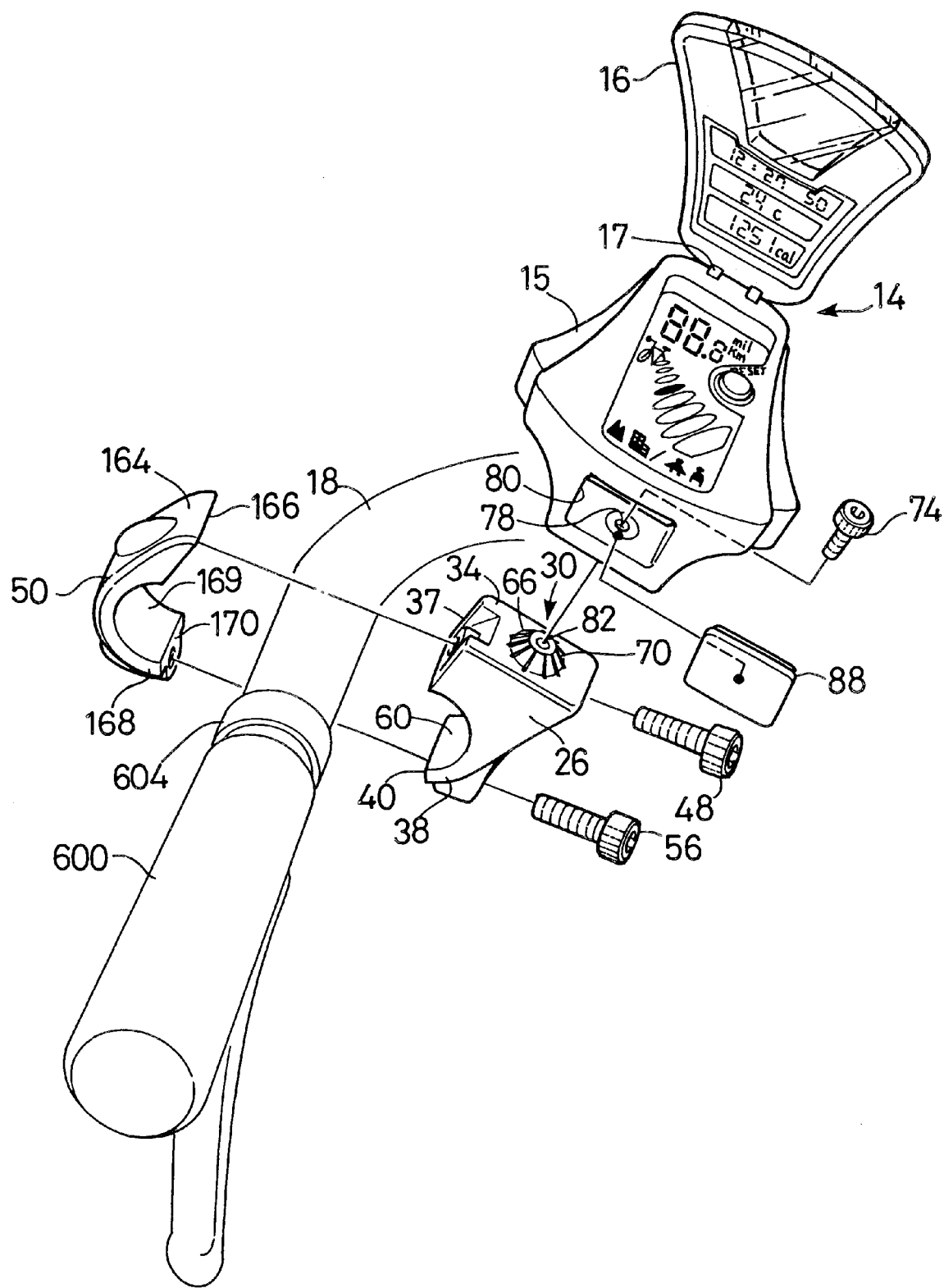
FIG. 11 is an exploded view of the apparatus shown in FIG. 10.

FIG. 10 is a perspective view of another alternative embodiment of an apparatus according to the present invention for mounting the bicycle display 14 to a steering member of a bicycle, and more particularly to handlebar 18 in close proximity to a grip 600 and brake lever bracket 604, wherein the display 14 is rotated to accommodate the orientation of the handlebar. FIG. 11 is an exploded view of the apparatus shown in FIG. 10. The structure of this apparatus is the same as the embodiment shown in FIGS. 3 and 4 except mounting arch 26 and complementary arch 150 are formed thinner, so the components are numbered identically to those shown in FIGS. 3 and 4.

While the above is a description of various embodiments of the present invention, further modifications may be employed without departing from the spirit and scope of the present invention. For example, the size, shape, location or orientation of the various components may be changed as desired. The extension arms shown in the embodiments of FIGS. 6–9 may take the form of one or more flexible "goose-neck" type extensions to facilitate changing the position of the display. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for mounting a bicycle display to a steering member of a bicycle comprising:
   a mounting arch;
   a display coupler disposed on the mounting arch;
   a display disposed on the display coupler for displaying a numeral;
   a first mounting section disposed at a first end of the mounting arch and having a first mounting surface and a first external surface extending away from the first mounting surface;
   wherein the first mounting section includes a first mounting opening extending completely through the first mounting section and intersecting the first mounting surface and the first external surface for receiving a first fastener therethrough;
   a second mounting section disposed at a second end of the mounting arch and having a second mounting surface and a second external surface extending away from the second mounting surface, wherein the second mounting surface does not face the first mounting surface; and
   wherein a position where the display coupler is mounted to the mounting arch is located closer to one of the first mounting surface or the second mounting surface than the other one of the first mounting surface or the second mounting surface.

2. The apparatus according to claim 1 wherein the first mounting surface is substantially parallel to the second mounting surface.

3. The apparatus according to claim 1 wherein the first mounting surface is disposed in substantially a same plane as the second mounting surface.

4. The apparatus according to claim 1 wherein the second mounting section includes a second mounting opening for receiving a second fastener therein.

5. The apparatus according to claim 4 wherein the second mounting opening extends completely through the second mounting section and intersects the second mounting surface and the second external surface.

6. The apparatus according to claim 1 wherein the mounting arch curves no more than 180°.

7. An apparatus for mounting a bicycle display to a steering member of a bicycle comprising:
   a mounting arch;
   a display coupler disposed on the mounting arch;
   a display disposed on the display coupler for displaying a numeral;
   a first mounting section disposed at a first end of the mounting arch and having a first mounting surface and a first external surface extending away from the first mounting surface;
   wherein the first mounting section includes a first mounting opening extending completely through the first mounting section and intersecting the first mounting surface and the first external surface for receiving a first fastener therethrough;
   a second mounting section disposed at a second end of the mounting arch and having a second mounting surface and a second external surface extending away from the second mounting surface, wherein the second mounting surface does not face the first mounting surface;
   wherein the display coupler is located closer to one of the first mounting surface or the second mounting surface than the other one of the first mounting surface or the second mounting surface;
   wherein the mounting arch has a semicircular inner peripheral surface, wherein the first mounting surface is disposed at a first end of the inner peripheral surface and substantially perpendicular thereto, and the second mounting surface is disposed at a second end of the inner peripheral surface and substantially perpendicular thereto.

8. The apparatus according to claim 7 wherein the display coupler includes a display mounting member, wherein a plane perpendicular to the inner peripheral surface intersects the display mounting member.

9. The apparatus according to claim 8 wherein the plane intersects the first mounting surface and the second mounting surface.

10. An apparatus for mounting a bicycle display to a steering member of a bicycle comprising:
    a mounting arch;
    a display coupler disposed on the mounting arch;
    a display disposed on the display coupler for displaying a numeral;
    a first mounting section disposed at a first end of the mounting arch and having a first mounting surface and a first external surface extending away from the first mounting surface;
    wherein the first mounting section includes a first mounting opening extending completely through the first mounting section and intersecting the first mounting surface and the first external surface for receiving a first fastener therethrough;
    a second mounting section disposed at a second end of the mounting arch and having a second mounting surface and a second external surface extending away from the second mounting surface, wherein the second mounting surface does not face the first mounting surface;
    wherein the display coupler is located closer to one of the first mounting surface or the second mounting surface than the other one of the first mounting surface or the second mounting surface; and
    wherein the display coupler includes a rotational position setting member for setting a rotational position of the display relative to the mounting arch.

11. An apparatus for mounting a bicycle display to a steering member of a bicycle comprising:
    a mounting arch;
    a display coupler disposed on the mounting arch;
    a display disposed on the display coupler for displaying a numeral;
    a first mounting section disposed at a first end of the mounting arch and having a first mounting surface;
    wherein the first mounting section includes a first mounting opening extending completely through the first mounting section and intersecting the first mounting surface for receiving a first fastener therethrough;
    a second mounting section disposed at a second end of the mounting arch and having a second mounting surface that does not face the first mounting surface;
    wherein the display coupler includes a rotational position setting member for setting a rotational position of the display relative to the mounting arch; and
    wherein the rotational position setting member has a substantially hemispherical shape.

12. An apparatus for mounting a bicycle display to a steering member of a bicycle comprising:
    a mounting arch;

a display coupler disposed on the mounting arch, wherein the display coupler includes a rotational position setting member including a plurality of first splines for setting a rotational position of the display relative to the mounting arch;

a display disposed on the display coupler for displaying a numeral;

wherein the display includes a plurality of second splines for engaging the plurality of first splines;

a first mounting section disposed at a first end of the mounting arch and having a first mounting surface; and a second mounting section disposed at a second end of the mounting arch and having a second mounting surface.

13. An apparatus for mounting a bicycle handlebar and a bicycle display to a steering member comprising:

a handlebar stem having a first end for attaching to the steering member and a second end, wherein the second end includes:

a stem arch;

a first stem arch mounting section disposed at a first end of the stem arch and having a first stem arch surface; and a second stem arch mounting section disposed at a second end of the stem arch and having a second stem arch surface;

a display coupling member including:

a display mounting arch;

a display coupler disposed on the display mounting arch;

a first display mounting arch mounting section disposed at a first end of the display mounting arch and having a first display mounting arch surface that faces the first stem arch surface; and a second display mounting arch mounting section disposed at a second end of the display mounting arch and having a second display mounting arch surface that faces the second stem arch surface;

a display disposed on the display coupler for displaying a numeral; and a coupler for coupling the handlebar stem to the display coupling member.

14. An apparatus for mounting a bicycle display to a steering member of a bicycle comprising:

a mounting arch;

a display coupler disposed on the mounting arch;

a display disposed on the display coupler for displaying a numeral;

a first mounting section disposed at a first end of the mounting arch and having a first mounting surface and a first external surface extending away from the first mounting surface;

wherein the first mounting section includes a first mounting opening extending completely through the first mounting section and intersecting the first mounting surface and the first external surface for receiving a first fastener therethrough;

a second mounting section disposed at a second end of the mounting arch and having a second mounting surface and a second external surface extending away from the second mounting surface, wherein the second mounting surface does not face the first mounting surface;

wherein the display coupler is located closer to one of the first mounting surface or the second mounting surface than the other one of the first mounting surface or the second mounting surface; and wherein the display comprises a computer display.

15. The apparatus according to claim 14 wherein the computer display comprises an LCD panel.

16. The apparatus according to claim 1 wherein the display comprises a mechanical display.

17. The apparatus according to claim 12 wherein the display comprises a computer display.

18. The apparatus according to claim 17 wherein the computer display comprises an LCD panel.

19. The apparatus according to claim 12 wherein the display comprises a mechanical display.

20. The apparatus according to claim 13 wherein the display comprises a computer display.

21. The apparatus according to claim 20 wherein the computer display comprises an LCD panel.

22. The apparatus according to claim 13 wherein the display comprises a mechanical display.

23. The apparatus according to claim 12 wherein the rotational position setting member includes an opening, and wherein the plurality of splines extend radially from the opening.

24. The apparatus according to claim 12 wherein the rotational position setting member has a convex shape.

25. The apparatus according to claim 24 wherein the rotational position setting member has a substantially hemispherical shape.

* * * * *